United States Patent
Isobe

(10) Patent No.: US 11,815,147 B2
(45) Date of Patent: Nov. 14, 2023

(54) BIDIRECTIONAL TORQUE LIMITER

(71) Applicant: Origin Company, Limited, Saitama (JP)

(72) Inventor: Taro Isobe, Saitama (JP)

(73) Assignee: ORIGIN COMPANY, LIMITED, Saitama (JP)

(*) Notice: Subject to any disclaimer, the term of this patent is extended or adjusted under 35 U.S.C. 154(b) by 0 days.

(21) Appl. No.: 17/766,640

(22) PCT Filed: Sep. 30, 2020

(86) PCT No.: PCT/JP2020/037305
§ 371 (c)(1),
(2) Date: Feb. 6, 2023

(87) PCT Pub. No.: WO2021/260961
PCT Pub. Date: Dec. 30, 2021

(65) Prior Publication Data
US 2023/0193961 A1    Jun. 22, 2023

(30) Foreign Application Priority Data
Jun. 22, 2020 (JP) .................. 2020-107249

(51) Int. Cl.
F16D 7/02       (2006.01)
F16D 43/21      (2006.01)

(52) U.S. Cl.
CPC ............ F16D 7/022 (2013.01); F16D 43/211 (2013.01); *F16D 2300/06* (2013.01)

(58) Field of Classification Search
CPC . F16D 7/02; F16D 7/021; F16D 7/022; F16D 41/20; F16D 41/206; F16D 43/211; F16D 2300/06
(Continued)

(56) References Cited

U.S. PATENT DOCUMENTS 3,618,730 A    11/1971  Mould, III
7,766,774 B2*   8/2010  Antchak ............... F16D 7/022
                                                   464/40
(Continued)

FOREIGN PATENT DOCUMENTS

CN      101825145           9/2010
DE      102011088904 A1 *   6/2013 ........... F16D 41/206
(Continued)

OTHER PUBLICATIONS

Extended Search Report dated Feb. 3, 2023 in corresponding European Patent Application No. 20942121.3.
(Continued)

*Primary Examiner* — Josh Skroupa
(74) *Attorney, Agent, or Firm* — Wenderoth, Lind & Ponack, L.L.P.

(57) ABSTRACT

A bidirectional torque limier, which allows setting a slip torque for a case of inputting rotation from a driving part to be smaller than a slip torque for a case of inputting rotation from a driven part. The force of an external coil spring (42) to clamp an outer race (8) is set smaller than the force of an internal coil spring (48) to clamp an inner race (10), so that
(Continued)

the external coil spring (42) increases its diameter to slip with respect to the outer race (8) when a rotation torque is applied from the driving part, while the internal coil spring (48) increases its diameter to slip with respect to the inner race (10) when a rotation torque is applied from the driven part.

8 Claims, 11 Drawing Sheets

(58) Field of Classification Search
USPC ..................................................... 464/30, 40
See application file for complete search history.

(56) References Cited

U.S. PATENT DOCUMENTS

| | | | | |
|---|---|---|---|---|
| 8,813,928 | B2 * | 8/2014 | Schneider | F16D 7/022 |
| | | | | 192/41 S |
| 9,309,935 | B2 * | 4/2016 | Takada | F16D 41/20 |
| 9,702,412 | B2 * | 7/2017 | Hurry | F16D 7/022 |
| 9,982,721 | B2 * | 5/2018 | Antchak | F16D 41/206 |
| 10,590,994 | B2 * | 3/2020 | Antchak | F16D 7/022 |
| 11,598,379 | B2 * | 3/2023 | Isobe | F16D 7/022 |
| 2008/0207364 | A1 * | 8/2008 | Schebitz | F16F 15/1213 |
| | | | | 474/94 |
| 2019/0285128 | A1 * | 9/2019 | Cooley | F16D 41/206 |

FOREIGN PATENT DOCUMENTS

| | | | | |
|---|---|---|---|---|
| DE | 202016003558 U1 * | 8/2016 | | F16D 41/206 |
| DE | 202018000857 U1 * | 7/2018 | | F16D 41/206 |
| JP | 4-307129 | 10/1992 | | |
| JP | 10078044 A * | 3/1998 | | F16D 7/02 |
| JP | 2002-089592 | 3/2002 | | |
| JP | 2002-155973 | 5/2002 | | |
| JP | 2002155973 A * | 5/2002 | | F16D 7/022 |
| JP | 2006-265982 | 10/2006 | | |
| JP | 2017-122489 | 7/2017 | | |
| WO | WO-2012176641 A1 * | 12/2012 | | F16D 41/206 |

OTHER PUBLICATIONS

Office Action dated Aug. 29, 2022 in corresponding Chinese Patent Application No. 2020800836337, With English-language translation of search report.

International Search Report dated Nov. 10, 2020 in International (PCT) Application No. PCT/JP2020/037305.

* cited by examiner

ENLARGED B-B CROSS SECTION

A-A CROSS SECTION

A-A CROSS SECTION

A-A CROSS SECTION

A-A CROSS SECTION

B-B CROSS SECTION

Fig. 11
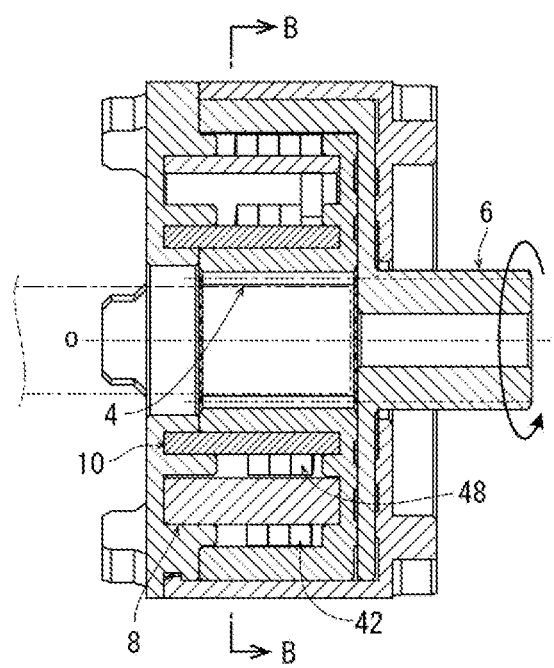
A-A CROSS SECTION
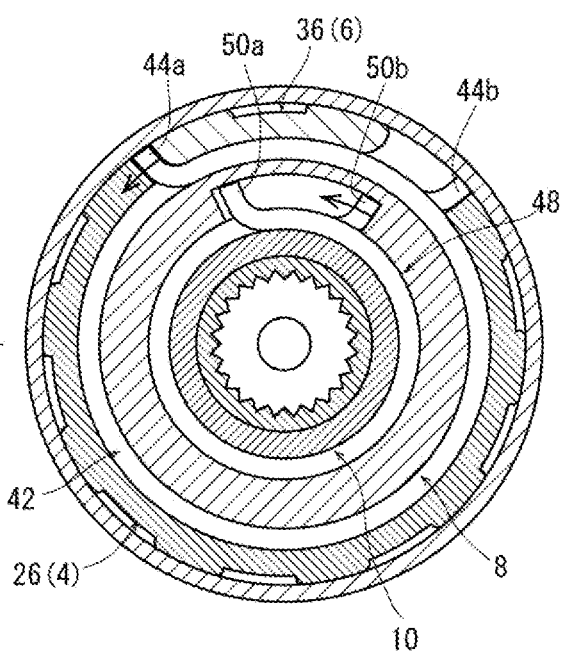
B-B CROSS SECTION

ENLARGED B-B CROSS SECTION

ENLARGED B-B CROSS SECTION

BIDIRECTIONAL TORQUE LIMITER

TECHNICAL FIELD

The present invention relates to a bidirectional torque limiter equipped with two coil springs.

BACKGROUND ART

Some of jumping hatchbacks mounted on the rear end of vehicles such as a wagon or a van can be opened and closed by electric motor. Patent Document 1 below discloses a hatchback that is activated to switch (open/close) between the fully-opened position and the fully-closed position by an electric motor. When this hatchback is stopped at the fully-opened position or at any position between the fully-opened position and the fully-closed position, the hatchback is held by an electromagnetic clutch. If drive of the electric motor as the input-side device stops in this switching apparatus, the hatchback as an output-side device is held by the electromagnetic clutch, and this prevents the hatchback from falling by its own weight.

A bidirectional torque limiter can be employed as a component for holding a driven member (output-side device) such as a hatchback at any suitable angular position, without relying on any electric means. Patent Document 2 below discloses one example of the bidirectional torque limiter, which is equipped with an outer race and an inner race that share a central axis. In this example, an external coil spring and an internal coil spring are mounted respectively on the outer peripheral surface and the inner peripheral surface of the outer race. (Here, "outer race" and "inner race" correspond respectively to "inner ring 2" and "cylindrical fold 1m of outer ring 1" in Patent Document 2.) The inner diameter of the external coil spring in a free state is smaller than the outer diameter of the outer race. In the static state, the inner peripheral surface of the external coil spring is in a close contact with the outer peripheral surface of the outer race. The external coil spring has an external hook portion, and the external hook portion is fixed to a housing integrated with the inner race. Meanwhile, the outer diameter of the internal coil spring in the free state is larger than the inner diameter of the outer race, and the outer peripheral surface of the internal coil spring in the static state is in a close contact with the inner peripheral surface of the outer race. The internal coil spring has an internal hook portion, and the internal hook portion is linked to an auxiliary member rotatable with respect to a housing. In this case, the direction for winding the wires of the external coil spring and the internal coil spring are the same when viewed from an axial direction. Namely, the direction that the internal hook portion is pushed circumferentially to loosen the clamping force of the internal coil spring is the same as the direction that the external hook portion is pushed circumferentially to loosen the clamping force of the external coil spring when viewed from an axial direction.

In a case where either a forward or a backward rotation torque is applied to the auxiliary member and the other rotation torque is applied to the housing when viewed from one axial direction, the following operations will be observed. Specifically, the internal hook portion of the internal coil spring is pushed by the auxiliary member in the direction to decrease the diameter of the internal coil spring. The external hook portion of the external coil spring is pushed by the housing in the direction to decrease the diameter of the external coil spring. In this manner, the frictional force between the internal coil spring and the outer race is decreased while the frictional force between the external coil spring and the outer race is increased. As a result, in a case where the rotation torque is larger than a first predetermined torque, the internal coil spring rotates (slips) with respect to the outer race, whereby the rotation torque is not transmitted. In a case where the rotation torque is smaller than the first predetermined torque, the auxiliary member and the housing rotate integrally, namely, the rotation torque is transmitted.

Different operations will be observed when the rotation torque in the opposite direction, i.e., the rotation torque in either the backward or forward direction is applied to the auxiliary member and when the rotation torque in the other direction is applied to the housing. Specifically, the internal hook portion of the internal coil spring is pushed by the auxiliary member in the direction to increase the diameter of the internal coil spring, while the external hook portion of the external coil spring is pushed by the housing in the direction to increase the diameter of the external coil spring. In this manner, the frictional force between the internal coil spring and the outer race is increased while the frictional force between the external coil spring and the outer race is decreased. As a result, in a case where the rotation torque is larger than a second predetermined torque, the external coil spring rotates (slips) with respect to the outer race, whereby the rotation torque is not transmitted. In a case where the rotation torque is smaller than the second predetermined torque, the auxiliary member and the housing rotate integrally, namely, the rotation torque is transmitted.

In a case of using the aforementioned bidirectional torque limiter as an angular position retaining mechanism component of the hatchback, the housing is fixed to the vehicle, and the auxiliary member is connected to a driving member such as an electric motor. As a result, the electric motor applies a rotation torque larger than the first predetermined torque and the second predetermined torque to the auxiliary member so that the electric motor is capable of opening/closing the hatchback. When the electric motor stops in a state where the hatchback is at the fully-opened position or an intermediate position, the auxiliary member is applied with a predetermined load torque due to the weight of the hatchback. In a case where the load torque is smaller than the first predetermined torque and the second predetermined torque, the hatchback is held at the stop position.

In this case, it is preferable from the viewpoint of reducing the production cost for instance that the bidirectional torque limiter is capable of opening or closing the hatchback even when the electric motor is in a light load mode, and that the bidirectional torque limiter is capable of reliably holding the relatively heavy hatchback at the fully-opened position or an intermediate position. Therefore, it is preferable to set the slip torque to be smaller in a case where the rotation is input from the driving part in comparison with a case where the rotation is input from the driven part. Here, the slip torque indicates a torque at the time a member connected to the driving part and a member connected to the driven part begin a relative rotation.

PRIOR ART DOCUMENTS

Patent Documents

[Patent Document 1] JP-A 2006-265982
[Patent Document 2] JP-A 2002-155973

SUMMARY OF THE INVENTION

Problem to be Solved by the Invention

As mentioned above, in the bidirectional torque limiter disclosed in the Patent Document 2, a rotation torque can be applied by inputting rotation in any of the forward direction or the backward direction from the driving part, or by inputting rotation in the other direction from the driven part when viewed from one axial direction. In any case, the applied rotation torque acts on the same coil spring. Therefore, if the slip torque for rotating in the one direction from the driving part is set small, inevitably the slip torque for rotation in the other direction from the driven part will be also set small.

The present invention has been made on the basis of the aforementioned facts, and a main object of the present invention for overcoming the problems is to provide a novel and improved bidirectional torque limiter that is capable of setting a slip torque for a case of inputting rotation from a driving part to be smaller than a slip torque for a case of inputting rotation from a driven part.

Means for Solving the Problems

After the intensive researches, the present inventors have found that the aforementioned main technical problems can be solved by setting the force of the external coil spring to clamp the outer race to be smaller than the force of the internal coil spring to clamp the inner race. As a result, when a rotation torque is applied from the driving part, the external coil spring increases its diameter so that the external coil spring is allowed to slip with respect to the outer race. When a rotation torque is applied from the driven part, the internal coil spring increases its diameter so that the internal coil spring is allowed to slip with respect to the inner race.

Specifically, the present invention provides a bidirectional torque limiter for solving the aforementioned main technical problems, which is a bidirectional torque limiter comprising an input member, an output member, an outer race and an inner race, which share a central axis, wherein
- an input locking piece extending axially is formed at the input member and an output locking piece extending axially is formed at the output member, the input locking piece and the output locking piece are arranged in combination to form two gaps in the circumferential direction,
- an external coil spring is mounted on the outer peripheral surface of the outer race, the external coil spring in a free state has an inner diameter smaller than the outer diameter of the outer race, and the external coil spring clamps the outer race with a relatively small clamping force,
- the external coil spring has two external hook portions at angular positions different from each other in the circumferential direction, and each of the two external hook portions is inserted in each of the two gaps,
- an internal coil spring is mounted on the outer peripheral surface of the inner race, the internal coil spring in a free state has an inner diameter smaller than the outer diameter of the inner race, and the internal coil spring clamps the inner race with a relatively large clamping force,
- the internal coil spring has two internal hook portions at angular positions different from each other in the circumferential direction, each of the two internal hook portions is inserted in a hook groove formed on the inner peripheral surface of the outer race, or each of the two internal coil springs are arranged at the both sides of a hook ridge formed on the inner peripheral surface of the outer race,
- when a rotation torque is applied to the input member, the input locking piece pushes one of the two external hook portions so as to increase the diameter of the external coil spring, and
- when a rotation torque is applied to the output member, the output locking piece pushes one of the two external hook portions so as to decrease the diameter of the external coil spring to clamp the outer race, and the outer race pushes the other internal hook portion so as to increase the diameter of the internal coil spring.

Preferably, the input member, the output member, the outer race and the inner race are housed in a housing, and the inner race is fixed to the housing. In this case, it is favorable that the housing has a housing space having a circular cross section, both the input locking piece and the output locking piece have arc cross sections, and the outer peripheral surfaces of the input locking piece and the output locking piece are slidable with respect to the inner peripheral surface of the housing. Further, it is preferable that grooves extending axially are formed on the outer peripheral surfaces of the input locking piece and the output locking piece. Suitably, the input member comprises an input plate perpendicular to the axial direction and equipped with the input locking piece and, the output member comprises an output plate perpendicular to the axial direction and equipped with the output locking piece, and the input plate and the output plate are arranged axially to face each other. In this case, it is preferable that an input shaft to be inserted into the inner race is formed on the input plate. Suitably, the external coil spring and the internal coil spring are composed of wires each having a rectangular cross section. Preferably, a lubricant is applied on the external coil spring and the internal coil spring.

Effect of the Invention

In the bidirectional torque limiter of the present invention, the external coil spring is mounted on the outer peripheral surface of the outer race with a relatively small clamping force, and the internal coil spring is mounted on the outer peripheral surface of the inner race with a relatively large clamping force. When a rotation torque is applied to the input member, an input locking piece pushes one of two external hook portions so as to increase the diameter of the external coil spring. When a rotation torque is applied to the output member, an output locking piece pushes one of the two external hook portions so as to decrease the diameter of the external coil spring to clamp the outer race, while the outer race pushes the other internal hook portion, thereby increasing the diameter of the internal coil spring. Therefore, the slip torque for a case where rotation is input in the input member is set smaller than the slip torque for a case where rotation is input in the output member.

BRIEF DESCRIPTION OF THE DRAWINGS

FIG. 11 shows a state in which the output member of the bidirectional torque limiter shown in FIG. 1 is applied with a rotation torque.

MODE FOR CARRYING OUT THE INVENTION

Hereinafter, a preferred embodiment of a bidirectional torque limiter configured in accordance with the present invention will be described in more detail with reference to the accompanying drawings.

Figure 1:
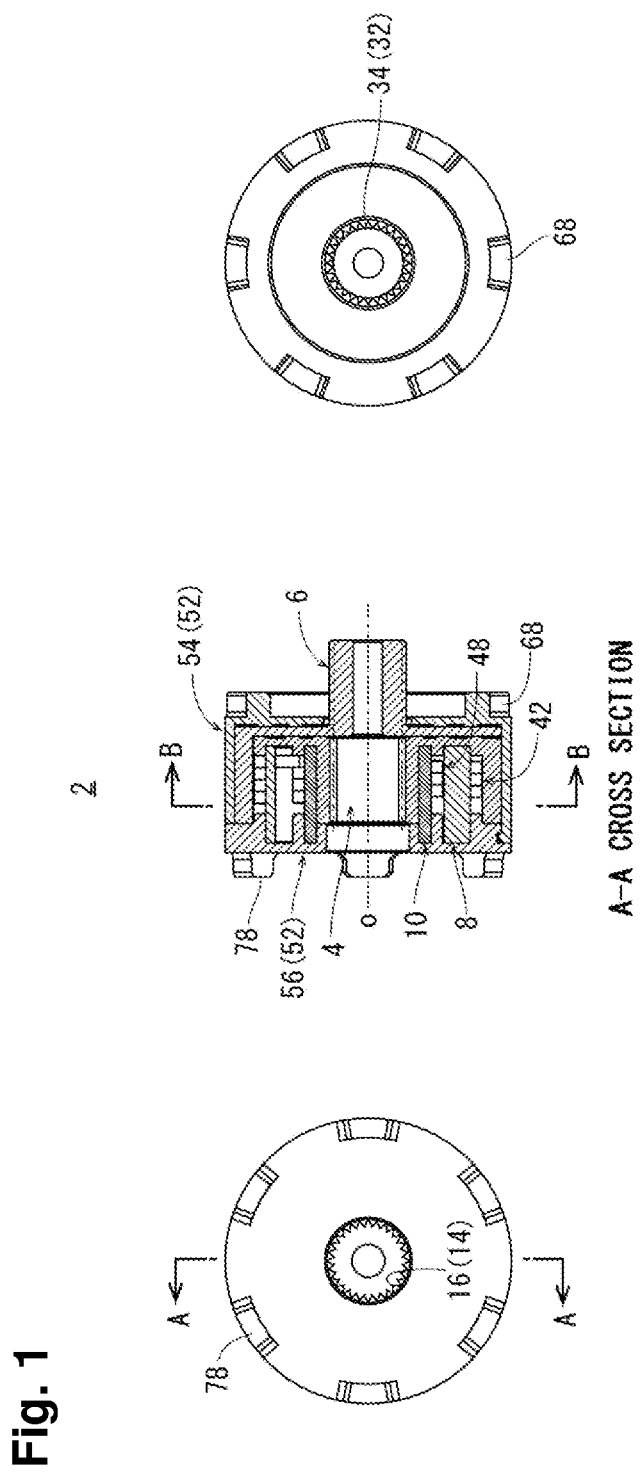
FIG. 1 includes views showing a suitable embodiment of bidirectional torque limiter configured according to the present invention.
Figure 2:
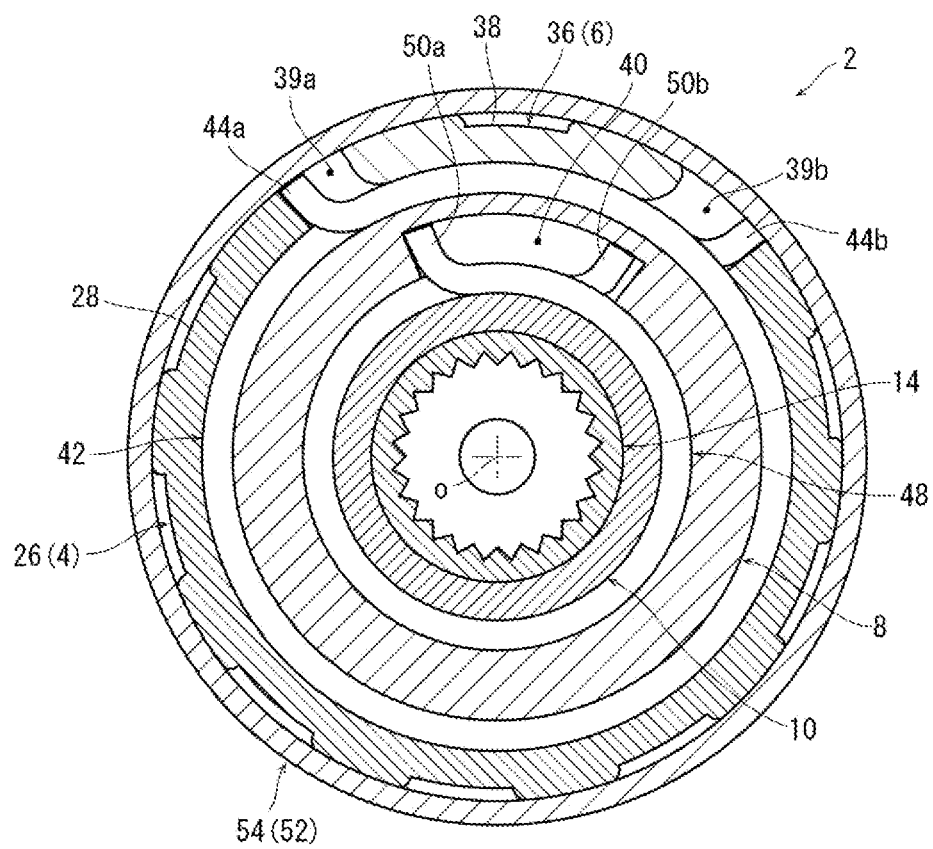
FIG. 2 is an enlarged view showing the B-B cross section of the bidirectional torque limiter shown in FIG. 1.
Figure 3:
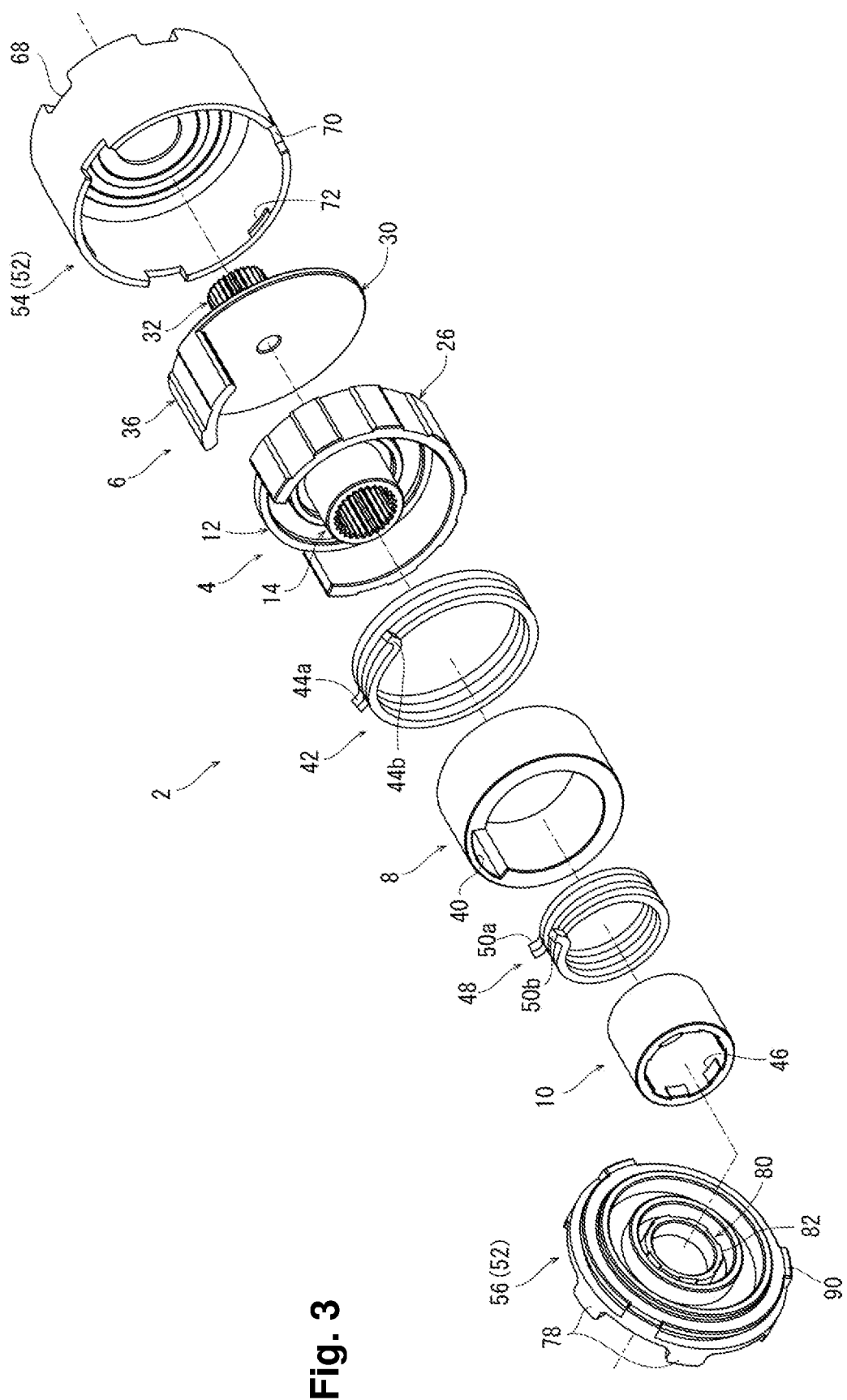
FIG. 3 is an exploded perspective view showing respective components of the bidirectional torque limiter shown in FIG. 1.

The following explanation is made referring to FIGS. 1-3. A bidirectional torque limiter, which is configured according to the present invention and denoted with numeral 2, has an inner race 4, an output member 6, an outer race 8, and an inner race 10, which share a central axis o. In this context, "axial first side" indicates the left side in the A-A cross sectional of FIG. 1, and "axial second side" indicates the right side in the same view unless otherwise specified.

Figure 4:
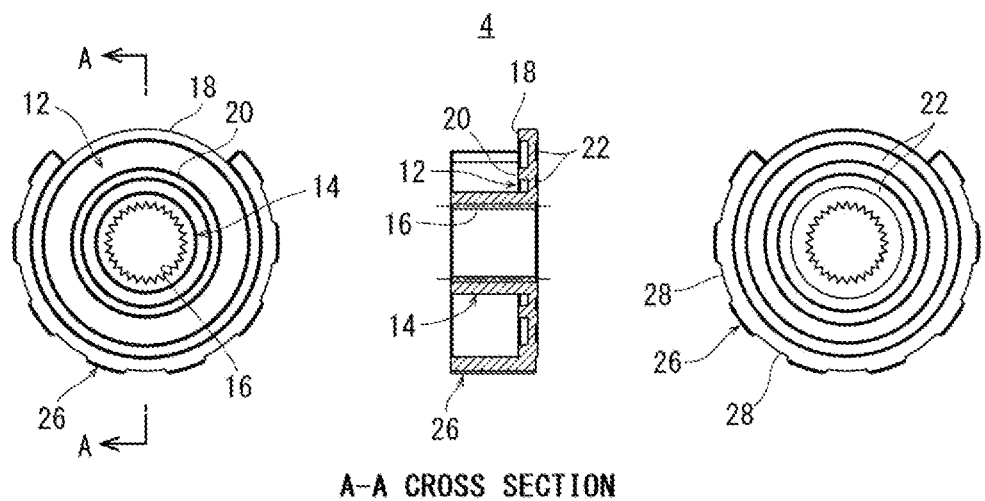
FIG. 4 shows the input member of the bidirectional torque limiter shown in FIG. 1.

The following explanation is made referring to FIG. 4, together with FIGS. 1-3. The input member 4 made of a synthetic resin is equipped with a circular input plate 12 perpendicular to the axial direction. At the center of the input plate 12, a cylindrical input shaft 14 extending toward the axial first side is formed. The input shaft penetrates in the axial direction, and a spline 16 extending along the axial direction is formed on the inner peripheral surface thereof. The input shaft 14 is to be connected to a driving member such as an electric motor via the spline 16. On the axial first side surface of the input plate 12, an external annular ridge 18 is formed along the outer peripheral edge. Inside the external annular ridge 18, further an internal annular ridge 20 is formed concentrically therewith. On the axial second side surface of the input plate 12, two annular grooves 22 are formed concentrically with the common rotational axis o. The input member 4 further has an input locking piece 26 extending in the axial direction. In the shown embodiment, the input locking piece 26 is a plate-like piece having an arc cross section and formed on the outer peripheral surface of the input plate 12 so as to extend toward the axial first side. On the outer peripheral surface of the input locking piece 26, a plurality of grooves 28 extending linearly along the axial direction are formed circumferentially at equiangular intervals.

Figure 5:
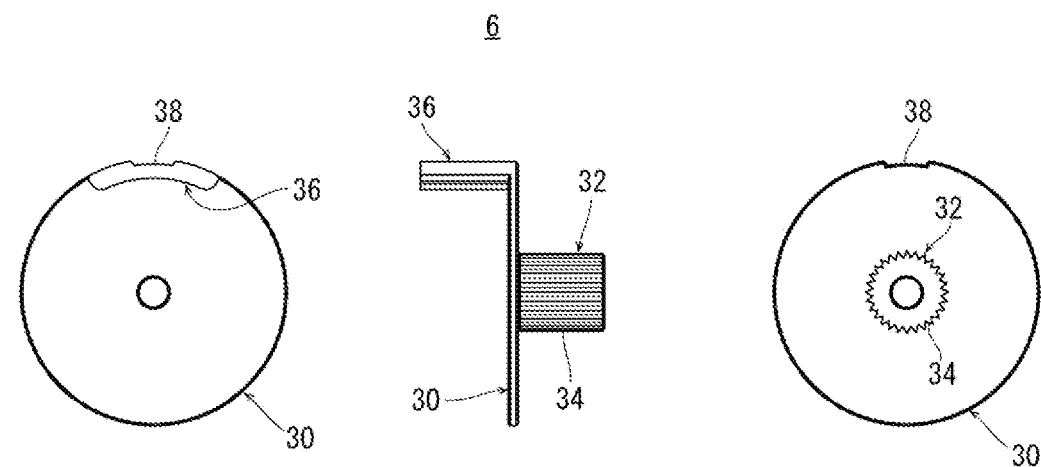
FIG. 5 shows the output member of the bidirectional torque limiter shown in FIG. 1.

The following explanation is made referring to FIG. 5, together with FIGS. 1-3. The output member 6 made of a synthetic resin is equipped with a circular output plate 30 that is perpendicular to the axial direction. The output plate 30 is arranged such that its axial first side surface faces the axial second side surface of the input plate 12 in the axial direction. At the center of the output plate 30, a cylindrical output shaft 32 is formed to extend toward the axial second side. The output shaft 32 penetrates in the axial direction, and on its outer peripheral surface, a spline 34 extending along the axial direction is formed. The output shaft 32 is to be connected to a driven member such as a hatchback via the spline 34. The output member 6 is equipped further with an output locking piece 6 extending axially. In the shown embodiment, the output locking piece 36 is a plate-shaped piece formed on the outer peripheral surface of the output plate 30, and it has an arc cross section and extends toward the axial first side. At the circumferential center of the outer peripheral surface of the output locking piece 36, a groove 38 extending linearly along the axial direction is formed.

As for the input member 4 and the output member 6, the input locking piece 26 and the output locking piece 36 are arranged in combination so that two gaps 39a and 39b are present in the circumferential direction as shown in FIG. 2.

Figure 6:
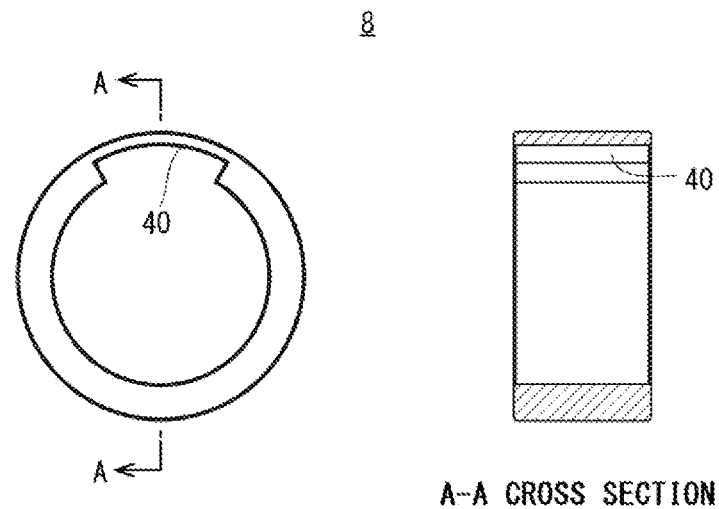
FIG. 6 shows the outer race of the bidirectional torque limiter shown in FIG. 1.

The following explanation is made referring to FIG. 6, together with FIGS. 1-3. The outer race 8 is a metal cylindrical member having a certain axial length, which is arranged inside the input locking piece 26 and the output locking piece 36. The axial second end portion of the outer race 8 is fitted between the external annular ridge 18 and the internal annular ridge 20 of the input member 4. The input member 4 is rotatable with respect to the outer race 8. On the inner peripheral surface of the outer race 8, a hook groove 40 extending linearly along the axial direction is formed. The hook groove 40 has a fan shape in a plan view, and it is formed by locally increasing the inner diameter of the outer race 8.

On the outer peripheral surface of the outer race 8, an external coil spring 42 is mounted. The external coil spring 42 is formed by winding a metal wire having a rectangular cross section. The inner diameter of the external coil spring 4 in a free state is smaller than the outer diameter of the outer race 8. A lubricant is coated on the external coil spring 42. Alternatively, the wire may have a circular cross section. The clamping force applied by the external coil spring 42 to the outer race 8 will be explained later. The external coil spring 42 is provided with two external hook portions 44a and 44b at angular positions different from each other in the circumferential direction. In the shown embodiment, the wire composing the external coil spring 42 is wound clockwise from the axial first side to the second side (see FIG. 2), and the wire is bent at the both axial end portions radially outward to form the external hook portions 44a and 44b. As shown in FIG. 2, the external hook portions 44a and 44b of the external coil spring 42 are inserted respectively in the two gaps 39a and 39b. When the input member 4 rotates with respect to the outer race 8, the input locking piece 26 pushes either the external hook portion 44a or the external hook portion 44b in accordance with the rotation direction to increase the diameter of the external coil spring 42. When the output member 6 rotates with respect to the outer race 8, the output locking piece 36 pushes either the external hook portion 44a or the external hook portion 44b in accordance with the rotation direction to decrease the diameter of the external coil spring 42. In this case, the external coil spring 42 clamps the outer race 8 with a relatively small clamping force (i.e., the difference between the inner diameter of the external coil spring 42 in the free state and the outer diameter of the outer race 8 is relatively small). This decreases the frictional force between the inner peripheral surface of the external coil spring 42 and the outer peripheral surface of the outer race when the input locking piece 26 pushes either the external hook portion 44a or 44b for increasing the diameter of the external coil spring 42, and thus, the torque at the time the external coil spring 42 starts rotation with respect to the outer race 8 (this is called "first predetermined torque") is relatively small.

Figure 7:
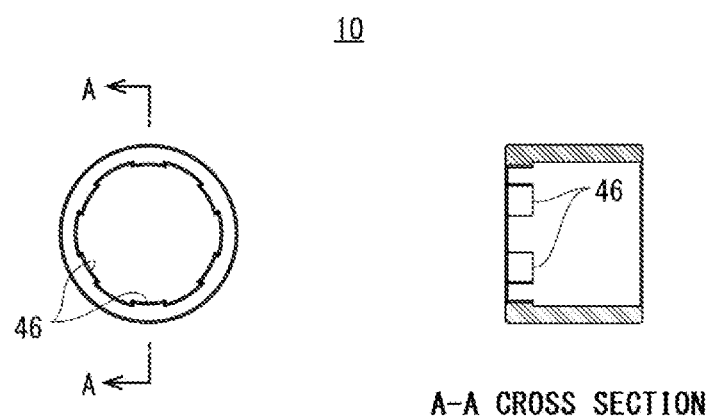
FIG. 7 shows the inner race of the bidirectional torque limiter shown in FIG. 1.

The following explanation is made referring to FIG. 7, together with FIGS. 1-3. The inner race 10 is a metal cylindrical member that is axially as long as the outer race 8 and arranged inside the outer race 8. An input shaft 14 of the input member 4 is inserted into the inner race 10. The axial second end portion of the inner race 10 is fitted between the internal annular ridge 20 and the input shaft 14 of the input member 4. The input member 4 is rotatable with respect to the inner race 10. As mentioned later, in the shown embodiment, the inner race 10 is fixed by the shield plate that is a part of the housing. On the inner peripheral surface at the axial first end portion of the inner race 10, a plurality of engaging protruding portions 46 protruding radially inward are provided circumferentially at equiangular intervals.

On the outer peripheral surface of the inner race 10, an internal coil spring 48 is mounted. The internal coil spring 48 is formed by winding a metal wire having a rectangular cross section. The inner diameter of the internal coil spring 48 in a free state is smaller than the outer diameter of the inner race 10, and a lubricant is applied on the internal coil spring 48. The clamping force applied by the internal coil spring 48 to the inner race 10 will be explained later. The internal coil spring 48 is provided with two internal hook portions 50a and 50b at angular positions different from each other in the circumferential direction. In the shown embodiment, the wire composing the internal coil spring 48 is wound clockwise from the axial first side to the second side (see FIG. 2), and the wire is bent at the both axial end portions radially outward to form the internal hook portions 50a and 50b. As shown in FIG. 2, both the internal hook portions 50a and 50b of the internal coil spring 48 are to be inserted into a hook groove 40 formed on the inner peripheral surface of the outer race 8. When the outer race 8 rotates with respect to the inner race 10, the outer race 8 pushes any of the internal hook portions 50a and 50b in accordance with the rotation direction to increase the diameter of the internal coil spring 48. In this case, the internal coil spring 48 clamps the inner race 10 with a relatively large clamping force (i.e., the difference between the inner diameter of the internal coil spring 48 in the free state and the outer diameter of the inner race 10 is relatively large). This can decreases the frictional force between the inner peripheral surface of the internal coil spring 48 and the outer peripheral surface of the inner race 10 when the outer race 8 pushes any of the internal hook portions 50a and 50b for increasing the diameter of the internal coil spring 48, and thus, the torque at the time the internal coil spring 48 starts rotation with respect to the inner race 10 (this is called "second predetermined torque") is relatively large.

As shown in FIGS. 1-3, in the shown embodiment, the input member 4, the output member 6, the outer race 8 and the inner race 10 are housed in the housing 52, and the inner race 10 is fixed to the housing 52. The housing 52 is formed of a housing body 54 formed with a housing space 53 having a circular cross section, and a shield 56 to close the housing space 53 of the housing body 54.

Figure 8:
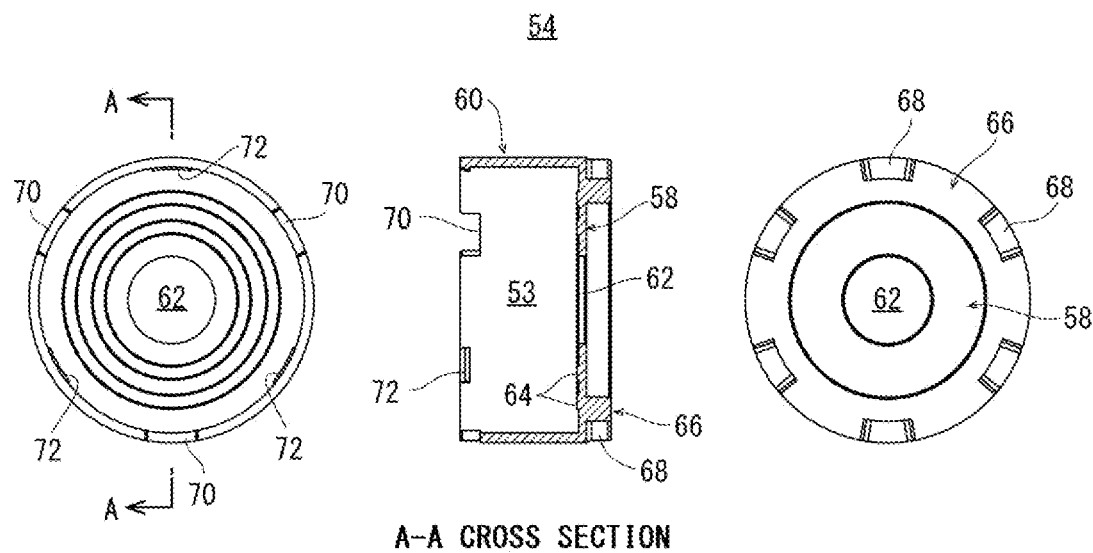
FIG. 8 shows the housing body of the bidirectional torque limiter shown in FIG. 1.

The following explanation is made referring to FIG. 8, together with FIGS. 1-3. The housing body 54 made of a synthetic resin is shaped like a cup having a circular end plate 58 and a cylindrical outer peripheral wall 60 extending from the outer peripheral edge of the end plate 58 toward the axial first side. At the center of the end plate 58, a circular thorough hole 62 is formed, into which the output shaft 32 is to be inserted. Two ring-shape ridges 64 are concentrically formed on the axial first side surface of the end plate 58 so as to surround the through hole 62. A substantially cylindrical outer peripheral ridge 66 is formed at the outer peripheral edge portion on the axial second side surface of the end plate 58. On the outer peripheral surface of the outer peripheral ridge 66, a plurality of recessed portions 68 are formed circumferentially at equiangular intervals. At the axial first end portion of the outer peripheral wall 60, three rectangular engaging notches 70 that are open toward the axial first side and three engaging protruding portions 72 protruding radially inward are formed alternately at equiangular intervals in the circumferential direction.

Figure 9:
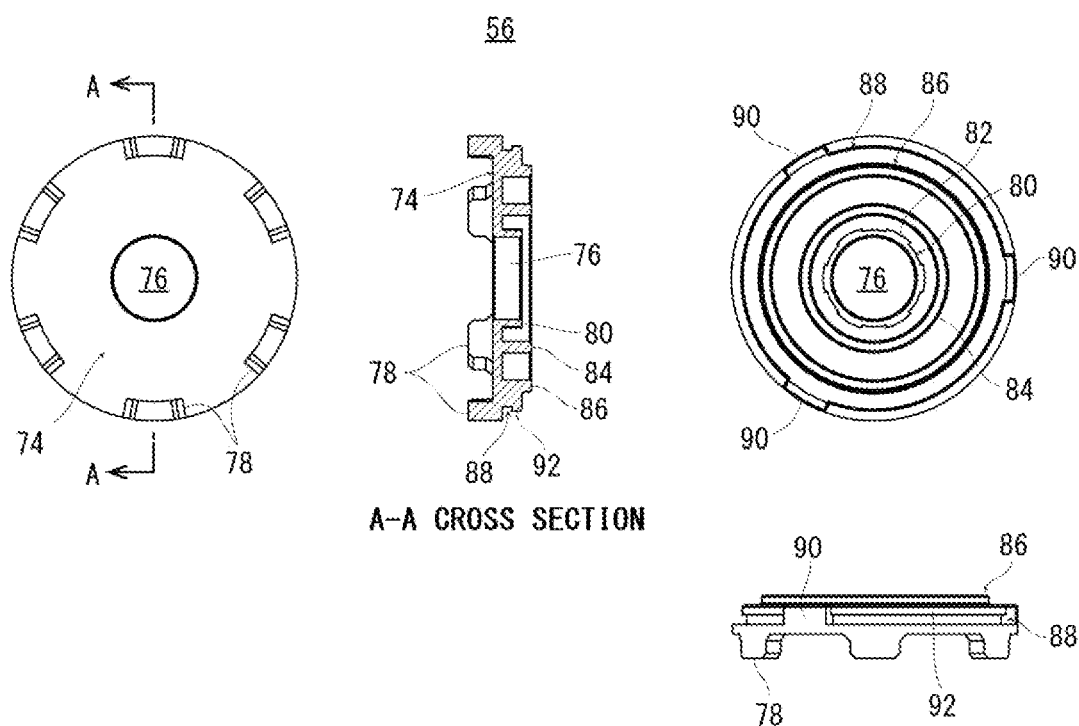
FIG. 9 shows the shield of the bidirectional torque limiter shown in FIG. 1.

The following explanation is made referring to FIG. 9, together with FIGS. 1-3. The shield 56 made of a synthetic resin comprises a circular substrate 74. At the center of the substrate 74, a circular thorough hole 76 is formed. Into the through hole 76, a shaft (indicated with a chain-double-dashed line in FIGS. 10 and 11) to engage with the spline 16 of the input shaft 14 is to be inserted. At the outer peripheral edge portion of the axial first side surface of the substrate 74, a plurality of substantially rectangular engaging projecting portions 78 to protrude toward the axial first side are provided circumferentially at equiangular intervals. On the axial second side surface of the substrate 74, a cylindrical internal wall 80 for surrounding the outer peripheral edge of the through hole 76 and extending toward the axial second side is formed. The axial second end surface of the internal wall 80 faces the axial first end surface of the input shaft 14, thereby axially supporting the input shaft 14. On the outer peripheral surface of the internal wall 80, a plurality of engagement protruding portions 82 protruding radially outward are provided circumferentially at equiangular intervals. Outside the internal wall 80, a cylindrical intermediate wall 84 surrounding the internal wall 80 is formed concentrically. The axial first end portion of the inner race 10 is inserted between the internal wall 80 and the intermediate wall 84. And the inner race 10 is fixed to the shield 56 by engagement between the engaging protruding portions 46 and the engagement protruding portions 82. Outside the intermediate wall 84, a cylindrical external wall 86 for surrounding the intermediate wall 84 is formed concentrically. The axial first end portion of the outer race 8 is inserted between the external wall 86 and the intermediate wall 84, and the outer race 8 is rotatable with respect to the shield 56. On the outer peripheral surface of the external wall 86, a ring-shape bulging portion 88 that bulges radially outward is formed. On the outer peripheral surface of the ring-shape bulging portion 88, engagement protrusions 90 and an engagement protruding portion 92 are formed to be engaged with the engaging notches 70 and the engaging protruding portions 72 of the housing body 54. Their engagement joins the housing body 54 and the shield 56 in a relatively non-rotatable manner. The thus joined housing body 54 and the shield 56 makes the housing 52. The housing 52 can be fixed to a vehicle or the like by fitting projections (not shown) to the recessed portions 68 of the housing body 54 and by fitting recessed portions (not shown) to the engaging projecting portions 78 of the shield 56. As desired, a lubricant may be encapsulated in the housing 52.

Figure 10:
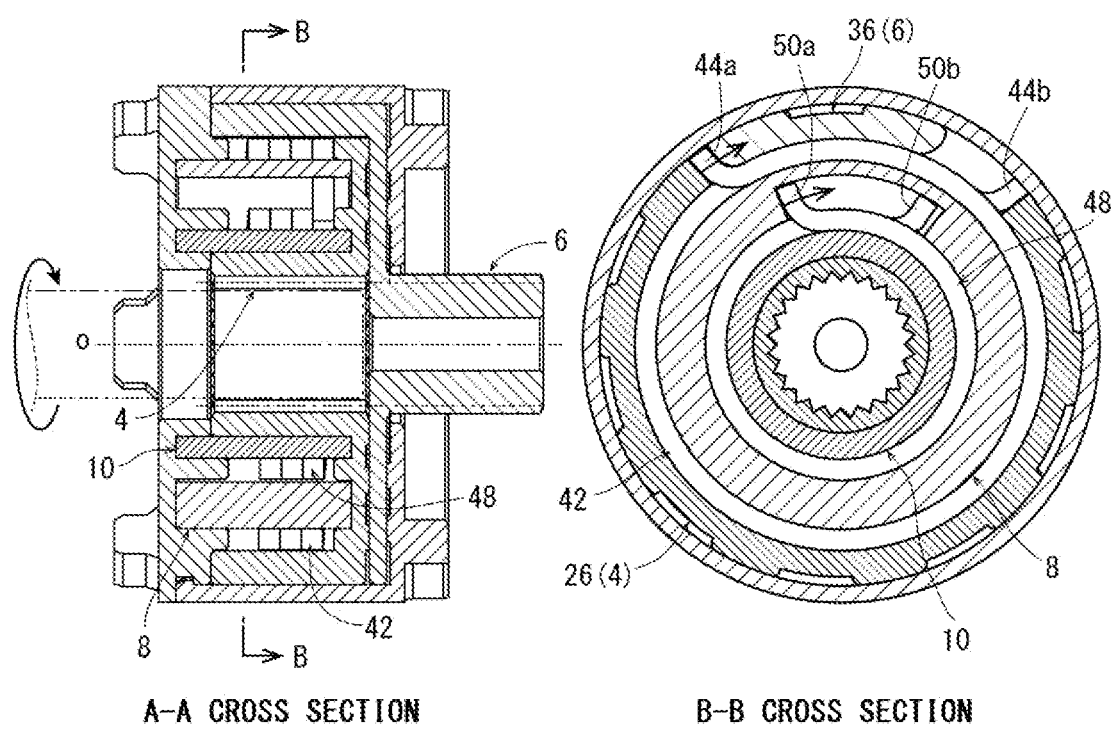
FIG. 10 shows a state in which the input member of the bidirectional torque limiter shown in FIG. 1 is applied with a rotation torque.

Next, the operation of the bidirectional torque limiter according to the present invention will be explained by referring to FIGS. 10 and 11.

The first explanation is made referring to FIG. 9, for a case where a rotation torque is applied clockwise (when viewed from the right side in the A-A cross section of FIG. 10, the same applies hereinafter) from a driving member such as an electric motor to the input member 4. In this case, as shown in the B-B cross section, the input locking piece 26 rotates clockwise to push clockwise the external hook portion 44a of the external coil spring 42. Here, the external coil spring 42 is mounted on the outer peripheral surface of the outer race 8, and thus, when the external hook portion 44a is pushed clockwise by the input locking piece 26, the outer race 8 pushes clockwise the internal hook portion 50a of the internal coil spring 48. At this time, both the external hook portion 44a and the internal hook portion 50a are pushed in the direction to increase the diameters of the external coil spring 42 and the internal coil spring 48. As a result, the frictional force between the inner peripheral surface of the external coil spring 42 and the outer peripheral surface of the outer race 8 is decreased, and the frictional force between the inner peripheral surface of the internal coil spring 48 and the outer peripheral surface of the inner race 10 is also decreased. However, as mentioned above, since the torque (first predetermined torque) at the time the external coil spring 42 starts rotating with respect to the outer race 8 is set smaller than the torque (second predetermined torque) at the time the internal coil spring 48 starts rotating with respect to the inner race 10, the external coil spring 42 rotates with respect to the outer race 8 before the internal coil spring 48 rotates with respect to the inner race 10. For the reason, in a case where the rotation torque applied to the input member 4 is larger than the first predetermined torque, the external coil spring 42 slips with respect to the outer race 8 since the input locking piece 26 pushes clockwise the external hook portion 44a of the external coil spring 42, the input locking piece 26 abuts the output locking piece 36 via the external hook portion 44a so as to integrally rotate therewith clockwise, and the rotation is transmitted from the input member 4 to the output member 6. In other words, it is possible to transmit the rotation even a relatively small rotation torque from the input member 4 to the output member 6.

In a case where the input member 4 rotate counterclockwise, the input locking piece 26 pushes counterclockwise the external hook portion 44b of the external coil spring 42, and the outer race 8 pushes counterclockwise the internal hook portion 50b of the internal coil spring 48. Excepting these, the operations are the same as the case where the input member 4 rotates clockwise. Therefore, detailed descriptions will be omitted.

The following explanation will be made by referring to FIG. 11 for a case where the output member 6 is applied with a counterclockwise rotation torque from a driven member such as a hatchback. In this case, as shown in the B-B cross section, the output locking piece 36 rotates counterclockwise to push counterclockwise the external hook portion 44a of the external coil spring 42, and the external coil spring 42 allows the outer race 8 to push counterclockwise the internal hook portion 50b of the internal coil spring 48. At this time, the external hook portion 44a is pushed in the direction to decrease the diameter of the external coil spring 42 so that the frictional force between the inner peripheral surface of the external coil spring 42 and the outer peripheral surface of the outer race 8 is increased. On the other hand, the internal hook portion 50b is pushed in the direction to increase the diameter of the internal coil spring 48 so that the frictional force between the inner peripheral surface of the internal coil spring 48 and the outer peripheral surface of the inner race 10 is decreased. As a result, in a case where the rotation torque applied to the output member 6 is larger than the second predetermined torque, the outer race 8 pushes counterclockwise the internal hook portion 50b of the internal coil spring 48 so that the internal coil spring 48 slips with respect to the inner race 10, the output locking piece 36 abuts the input locking piece 26 via the external hook portion 44b of the external coil spring 42 so as to rotate counterclockwise integrally therewith, whereby the rotation is transmitted from the output member 6 to the input member 4. This indicates that a relatively large rotation torque is required for transmitting rotation from the output member 6 to the input member 4.

In a case where the output member 6 rotates clockwise, the output locking piece 36 pushes clockwise the external hook portion 44b of the external coil spring 42 while the outer race 8 pushes clockwise the internal hook portion 50a of the internal coil spring 48. Excepting these, the operations are the same as the case where the output member 6 rotates counterclockwise. Therefore, detailed explanations will be omitted.

In the bidirectional torque limiter of the present invention, the external coil spring 42 is mounted on the outer peripheral surface of the outer race 8 with a relatively small clamping force, while the internal coil spring 48 is mounted on the outer peripheral surface of the inner race 10 with a relatively large clamping force. When a rotation torque is applied to the input member 4, the input locking piece 26 pushes any one of the two external hook portions 44a and 44b so as to increase the diameter of the external coil spring 42. On the other hand, when a rotation torque is applied to the output member 6, the output locking piece 36 pushes any one of the two external hook portions 44a and 44b so as to decrease the diameter of the external coil spring 42, thereby clamping the outer race 8. However, since the outer race 8 pushes the other of the two internal hook portions 50a and 50b, the diameter of the internal coil spring 48 is increased. Therefore, the slip torque in the case where rotation is input into the input member 4 is set to be smaller than the slip torque in the case where the rotation is input into the output member 6. In the shown embodiment, the input locking piece 26 and the output locking piece 36 are slidable with respect to the inner peripheral surface of the housing 52 at the time the input member 4 and the output member 6 rotate within the housing 52. This can prevent the input locking piece 26 or the output locking piece 36 from falling down outward in the radial direction. Furthermore, two grooves 28 and 38 extending axially are formed respectively on the outer peripheral surfaces of the input locking piece 26 and the output locking piece 36, whereby the contact area between the inner peripheral surface of the housing 52 and the outer peripheral surfaces of the input locking piece 26 and the output locking piece 36 is decreased to decrease the sliding resistance at the time the input locking piece 26 and the output locking piece 36 rotate with respect to the housing 52. In a case where a lubricant is encapsulated in the housing 52, the grooves 28 and 38 can serve as lubricant reservoirs.

Figure 12:
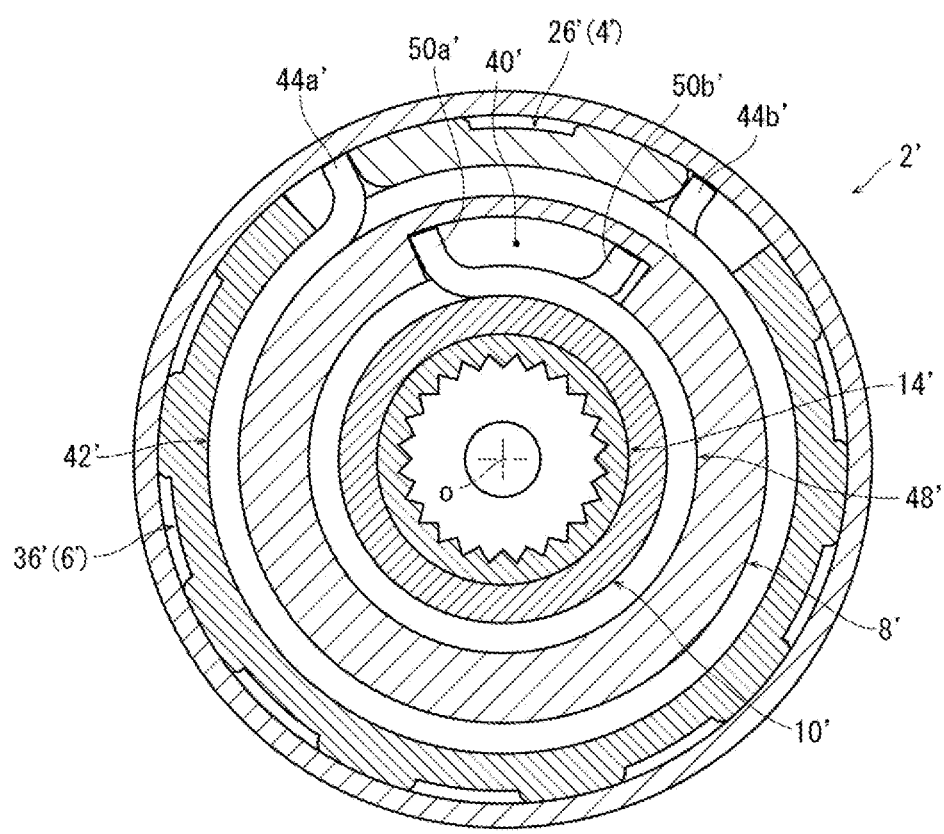
FIG. 12 shows a first variation of the bidirectional torque limiter shown in FIG. 1.
Figure 13:
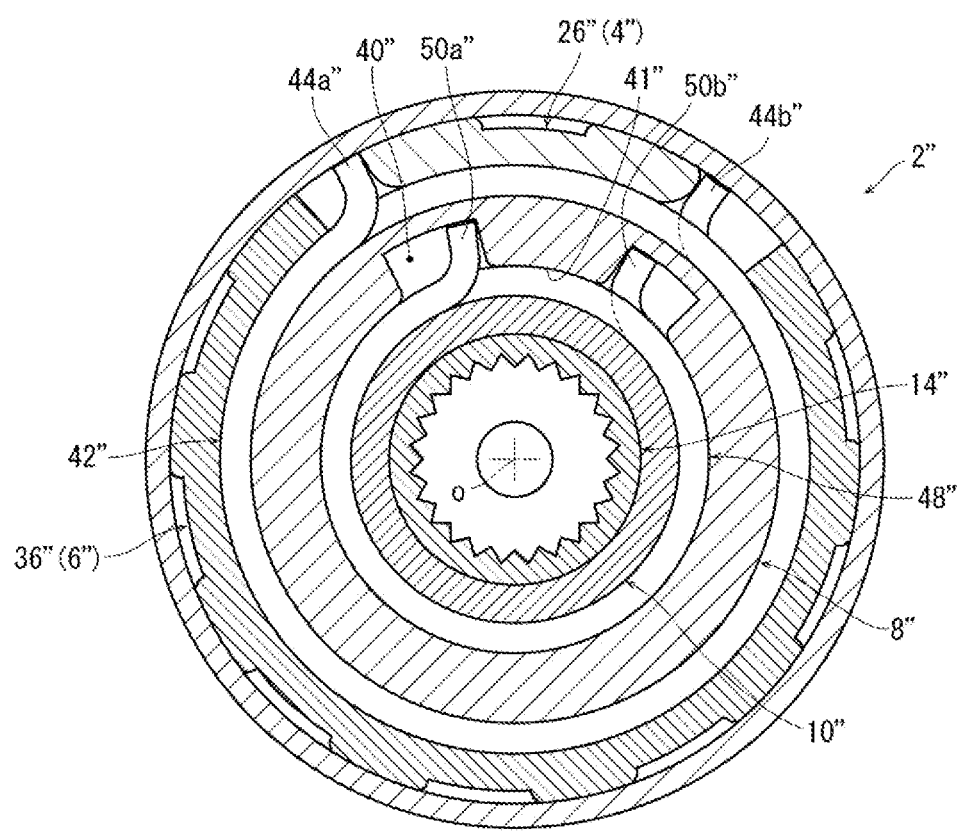
FIG. 13 shows a second variation of the bidirectional torque limiter shown in FIG. 1.
Figure 14:
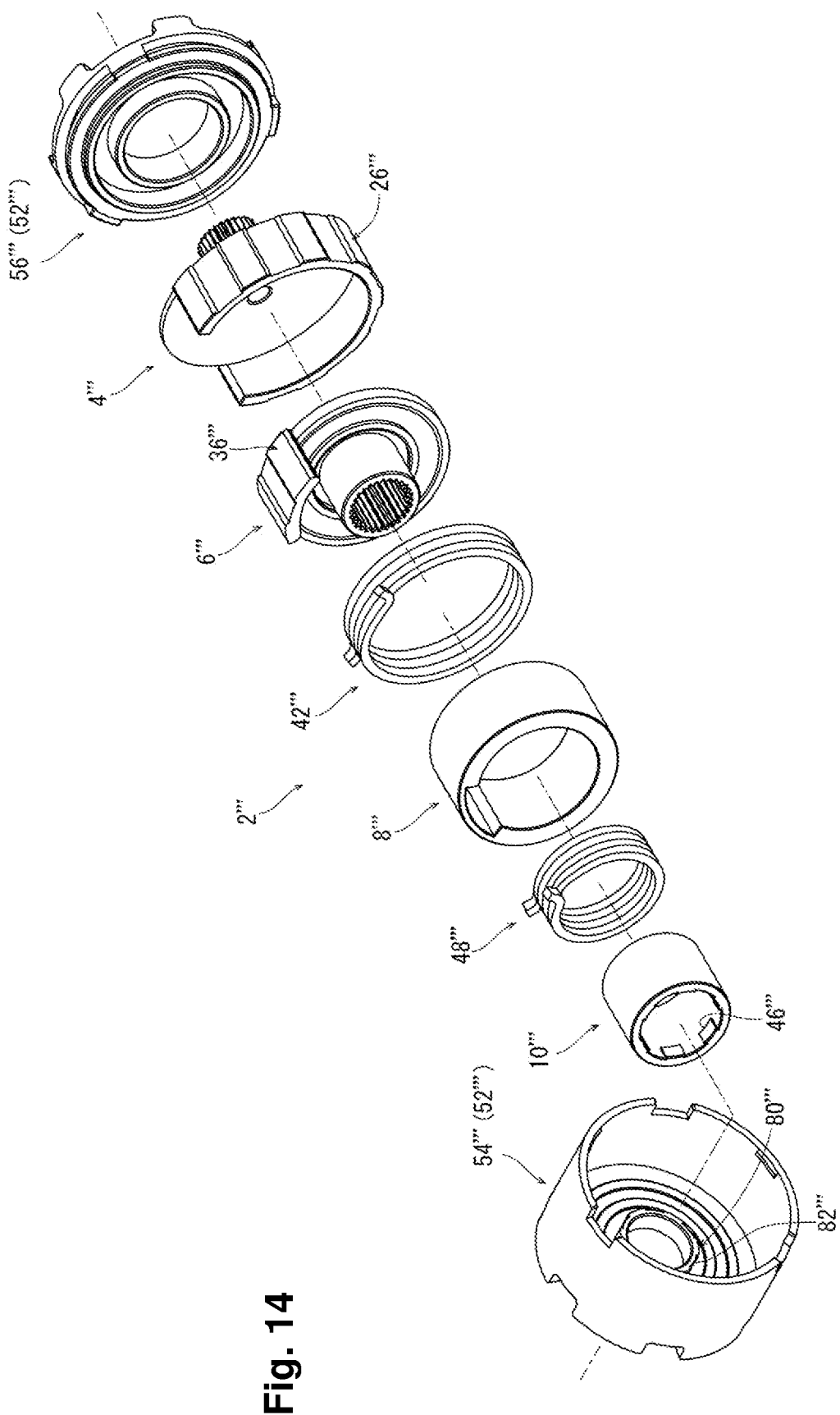
FIG. 14 shows a third variation of the bidirectional torque limiter shown in FIG. 1.

The following explanation is made by referring to FIGS. 12-14 for variations of the bidirectional torque limiter shown in FIG. 1, which is configured according to the present invention. Since the overall configurations of the respective bidirectional torque limiters shown in FIGS. 12 to 14 are the same as the configuration of the bidirectional torque limiter 2 shown in FIG. 1, components identical to those of the bidirectional torque limiter 2 are denoted with the same reference numbers with "'", "''" and "'''", and the detailed explanations therefor will be omitted. The same effects as those of the bidirectional torque limiter 2 will be obtained for the bidirectional torque limiters 2', 2" and 2'''.

FIG. 12 shows a cross section of the bidirectional torque limiter 2', which is taken at the same position for taking the B-B cross section of the bidirectional torque limiter 2 in FIG. 2. As understandable from a comparison between FIG. 2 and FIG. 12, the wire for composing the external coil spring 42 of the torque limiter 2 is wound clockwise from the axial first side to the second side (see FIG. 2), while the wire for composing the external coil spring 42" of the torque limiter 2' is wound counterclockwise from the axial first side to the second side (see FIG. 12). In the torque limiters 2 and 2', the wires composing the internal coil springs 48 and 48' are wound clockwise from the axial first side to the second side (see FIGS. 12 and 2). In the bidirectional torque limiter 2', the positions of the input locking piece 26 and the output locking piece 36 of the bidirectional torque limiter 2 are interchanged.

If necessary, as shown in FIG. 13, it is also possible to form a hook ridge 41" on the inner peripheral surface of the outer race 8", and the two internal hook portion 50a" and 50b" of the internal coil spring 48" are arranged at the both sides of the hook ridge 41". And further, the wire for composing the internal coil spring 48" can be wound counterclockwise from the axial first side to the second side (see FIG. 13) similarly to the wire for composing the external coil spring 42". In the shown embodiment, the hook ridge 41" is formed inside the hook groove 40".

FIG. 14, which corresponds to FIG. 3, is an exploded perspective view showing a bidirectional torque limiter 2'''. It is understandable from a comparison between FIG. 14 and FIG. 3 that the positions of the input locking piece 26 and the output locking piece 36 in the bidirectional torque limiter 2 of FIG. 3 are interchanged. Furthermore, the member serving as the input member 4 in the bidirectional torque limiter 2 becomes an output member 6''', and the member serving as the output member 6 in the bidirectional torque limiter 2 becomes an input member 4'''. The internal wall 80''' and the engagement protruding portion 82''' are formed not on the shield 56''' but on the housing body 54'''. And the inner race 10''' is fixed to the housing body 54'''.

The present invention is not limited to the aforementioned embodiments detailed with reference to the attached drawings for the bidirectional torque limiter configured according to the present invention, but further modifications and changes are possible without departing from the scope of the present invention. In the shown embodiments for instance, the input locking piece and the output locking piece each configured as a plate-shaped piece having an arc cross section may be replaced by a pair of rod-shape pieces disposed circumferentially at intervals. In this case, one of the pair of rod-shaped input locking pieces and one of the pair of rod-shaped output locking pieces define a gap while the other rod-shaped input locking piece and the other rod-shaped output locking piece define another gap. In the shown embodiments, both the two internal hook portions are inserted into the hook groove formed on the inner peripheral surface of the outer race. Alternatively, a plurality of hook grooves may be formed on the inner peripheral surface of the outer race so that the two hook portions may be inserted separately in any of the hook grooves.

EXPLANATIONS OF LETTERS OR NUMERALS

2: Bidirectional torque limiter
4: Input member
6: Output member
8: Outer race
10: Inner race
26: Input locking piece
36: Output locking piece
39a, 39b: Gaps
40: Hook groove
42: External coil spring
44a, 44b: External hook portions
48: Internal coil spring
50a, 50b: Internal hook portions

The invention claimed is:

1. A bidirectional torque limiter comprising an input member, an output member, an outer race and an inner race, which share a central axis, wherein
an input locking piece extending axially is formed at the input member and an output locking piece extending axially is formed at the output member, the input locking piece and the output locking piece are arranged in combination to form two gaps in a circumferential direction,
an external coil spring is mounted on an outer peripheral surface of the outer race, the external coil spring in a free state has an inner diameter smaller than an outer diameter of the outer race, and the external coil spring clamps the outer race with a relatively small clamping force,
the external coil spring has two external hook portions at angular positions different from each other in the circumferential direction, and each of the two external hook portions is inserted in a respective one of the two gaps,
an internal coil spring is mounted on an outer peripheral surface of the inner race, the internal coil spring in a free state has an inner diameter smaller than an outer diameter of the inner race, and the internal coil spring clamps the inner race with a relatively large clamping force,
the internal coil spring has two internal hook portions at angular positions different from each other in the circumferential direction, each of the two internal hook portions is inserted in a hook groove formed on an inner peripheral surface of the outer race, or the two internal hook portions are arranged at opposite sides of a hook ridge formed on the inner peripheral surface of the outer race,
when a rotation torque is applied to the input member, the input locking piece pushes one of the two external hook portions so as to increase a diameter of the external coil spring, and
when a rotation torque is applied to the output member, the output locking piece pushes one of the two external hook portions so as to decrease the diameter of the external coil spring and to clamp the outer race, and the outer race pushes another of the two internal hook portions so as to increase a diameter of the internal coil spring.

2. The bidirectional torque limiter according to claim 1, wherein the input member, the output member, the outer race and the inner race are housed in a housing, and the inner race is fixed to the housing.

3. The bidirectional torque limiter according to claim 2, wherein the housing has a housing space having a circular cross section, both the input locking piece and the output locking piece have arc cross sections, and outer peripheral surfaces of the input locking piece and the output locking piece are slidable with respect to an inner peripheral surface of the housing.

4. The bidirectional torque limiter according to claim 3, wherein grooves extending axially are formed on the outer peripheral surfaces of the input locking piece and the output locking piece.

5. The bidirectional torque limiter according to claim 1, wherein the input member comprises an input plate perpendicular to an axial direction and equipped with the input locking piece, the output member comprises an output plate perpendicular to the axial direction and equipped with the output locking piece, and the input plate and the output plate are arranged axially to face each other.

6. The bidirectional torque limiter according to claim 5, wherein an input shaft to be inserted into the inner race is formed on the input plate.

7. The bidirectional torque limiter according to claim 1, wherein the external coil spring and the internal coil spring are composed of wires each having a rectangular cross section.

8. The bidirectional torque limiter according to claim 1, wherein a lubricant is applied on the external coil spring and the internal coil spring.

* * * * *